US011870716B2

(12) United States Patent
Bendlin et al.

(10) Patent No.: US 11,870,716 B2
(45) Date of Patent: Jan. 9, 2024

(54) OFDMA-BASED MULTIPLEXING OF UPLINK CONTROL INFORMATION

(71) Applicant: Apple Inc., Cupertino, CA (US)

(72) Inventors: Ralf Matthias Bendlin, Cedar Park, TX (US); Gang Xiong, Beaverton, OR (US); Jong-Kae Fwu, Sunnyvale, CA (US); Hong He, Beijing (CN); Yushu Zhang, Beijing (CN); Seunghee Han, San Jose, CA (US); Yuan Zhu, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/958,529

(22) Filed: Oct. 3, 2022

(65) Prior Publication Data
US 2023/0023442 A1    Jan. 26, 2023

Related U.S. Application Data

(63) Continuation of application No. 17/181,797, filed on Feb. 22, 2021, now Pat. No. 11,510,187, which is a
(Continued)

(51) Int. Cl.
*H04L 5/00* (2006.01)
*H04W 72/21* (2023.01)
(Continued)

(52) U.S. Cl.
CPC ......... *H04L 5/0044* (2013.01); *H04B 1/7143* (2013.01); *H04L 5/0007* (2013.01);
(Continued)

(58) Field of Classification Search
CPC .. H04W 72/21; H04W 72/044; H04B 1/7143; H04L 5/0007; H04L 27/2613
See application file for complete search history.

(56) References Cited

U.S. PATENT DOCUMENTS

| 8,582,522 | B2 | 11/2013 | Amshaw et al. |
| 9,450,721 | B2 | 9/2016 | Park et al. |

(Continued)

FOREIGN PATENT DOCUMENTS

| CN | 104205710 A | 12/2014 |
| CN | 107852321 A | 3/2018 |

(Continued)

OTHER PUBLICATIONS

"U.S. Appl. No. 15/573,314, 312 Amendment filed Jun. 19, 2019", 8 pgs.

(Continued)

*Primary Examiner* — Chandrahas B Patel
(74) *Attorney, Agent, or Firm* — Kowert, Hood, Munyon, Rankin & Goetzel, P.C.

(57) ABSTRACT

Methods and apparatus are described for transmitting uplink control information (UCI) over an OFDMA-based uplink. In some embodiments, UCI symbols are mapped to resource elements (REs) in the time/frequency resource grid to maximize frequency diversity. In some embodiments, UCI is mapped in a manner that takes into account channel estimation performance by mapping UCI symbols to those REs that are closest (in terms of OFDM subcarriers/symbols) to REs that carry reference signals.

20 Claims, 11 Drawing Sheets

Related U.S. Application Data continuation of application No. 16/406,808, filed on May 8, 2019, now Pat. No. 10,952,188, which is a continuation of application No. 15/573,314, filed as application No. PCT/US2016/025569 on Apr. 1, 2016, now Pat. No. 10,420,083.

(60) Provisional application No. 62/269,363, filed on Dec. 18, 2015, provisional application No. 62/199,058, filed on Jul. 30, 2015.

(51) Int. Cl.
*H04B 1/7143* (2011.01)
*H04L 27/26* (2006.01)
*H04W 72/044* (2023.01)
*H04L 1/00* (2006.01)

(52) U.S. Cl.
CPC .......... *H04L 5/0051* (2013.01); *H04L 5/0055* (2013.01); *H04L 27/2613* (2013.01); *H04W 72/044* (2013.01); *H04W 72/21* (2023.01); *H04L 1/0026* (2013.01)

(56) References Cited

U.S. PATENT DOCUMENTS

| | | | |
|---|---|---|---|
| 9,974,062 B2 * | 5/2018 | Kim | H04L 1/1887 |
| 10,038,526 B2 | 7/2018 | Zhao et al. | |
| 10,063,351 B2 | 8/2018 | Blankenship et al. | |
| 2012/0063351 A1 | 3/2012 | Kim et al. | |
| 2013/0039197 A1 | 2/2013 | Pan et al. | |
| 2013/0301549 A1 | 11/2013 | Chen et al. | |
| 2014/0286255 A1 | 9/2014 | Nam et al. | |
| 2014/0376356 A1 | 12/2014 | Park et al. | |
| 2015/0016373 A1 * | 1/2015 | Hwang | H04L 1/1812 370/329 |
| 2015/0071195 A1 | 3/2015 | Park et al. | |
| 2018/0110041 A1 | 4/2018 | Bendlin et al. | |

FOREIGN PATENT DOCUMENTS

| | | |
|---|---|---|
| EP | 2797253 A1 | 10/2014 |
| WO | 2011112004 A2 | 9/2011 |
| WO | 2014126514 A1 | 8/2014 |
| WO | 2017019132 A1 | 2/2017 |

OTHER PUBLICATIONS

"U.S. Appl. No. 15/573,314, Non Final Office Action dated Jan. 15, 2019", 10 pgs.

"U.S. Appl. No. 15/573,314, Notice of Allowance dated May 8, 2019", 7 pgs.

"U.S. Appl. No. 15/573,314, PTO Response to Rule 312 Communication dated Jul. 2, 2019", 2 pgs.

"U.S. Appl. No. 15/573,314, Response filed Apr. 15, 2019 to Non Final Office Action dated Jan. 15, 2019", 9 pgs.

"Enhancements to UCI on PUSCH for Rel-13 CA", LG Electronics, R1-152719, 3 GPP TSG RAN WG1 Meeting #81, Fukuoka, Japan,. (May 16, 2015).

"European Application Serial No. 16830954.0, Extended European Search Report dated Jan. 30, 2019", 9 pgs.

"International Application Serial No. PCT/US2016/025569, International Search Report dated Aug. 29, 2016", 4 pgs.

"International Application Serial No. PCT/US2016/025569, Written Opinion dated Aug. 29, 2016", 10 pgs.

Office Action from Chinese Patent Application No. 201680044298. 3, dated Jun. 9, 2020, 9 pgs.

Examination Report from Indian Patent Application No. 201847006966, dated Jun. 25, 2020, 7 pgs.

First Examination Report in Indian Application No. 202048047838 dated Jan. 19, 2022, 7 pgs.

* cited by examiner

☒ DM RS
☒ REs FOR UCI (E.G. HARQ-ACK, RI, CQI)

☐ xPDCCH
☒ xPUCCH
▨ DM-RS

OFDMA-BASED MULTIPLEXING OF UPLINK CONTROL INFORMATION

PRIORITY CLAIM

This application is a continuation of U.S. patent application Ser. No. 17/181,797, filed Feb. 22, 2021, which is a continuation of U.S. patent application Ser. No. 16/406,808, filed May 8, 2019, now U.S. Pat. No. 10,952,188, which is a continuation of U.S. patent application Ser. No. 15/573,314, filed Nov. 10, 2017, now U.S. Pat. No. 10,420,083, which is a U.S. National Stage Filing under 35 U.S.C. 371 from International Application No. PCT/US2016/025569, filed on Apr. 1, 2016, and published as WO 2017/019132 on Feb. 2, 2017, which claims priority to U.S. Provisional Patent Application Ser. No. 62/199,058, filed Jul. 30, 2015 and 62/269,363, filed Dec. 18, 2015, each of which are hereby incorporated by reference herein in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments described herein relate generally to wireless networks and communications systems. Some embodiments relate to cellular communication networks including 3GPP (Third Generation Partnership Project) networks, 3GPP LTE (Long Term Evolution) networks, and 3GPP LTE-A (LTE Advanced) networks, although the scope of the embodiments is not limited in this respect.

BACKGROUND

In Long Term Evolution (LTE) systems, a mobile terminal (referred to as a User Equipment or UE) connects to the cellular network via a base station (referred to as an evolved Node B or eNB). Current LTE systems utilize orthogonal frequency division multiple access (OFDMA) for the downlink (DL) and a related technique, single carrier frequency division multiple access (SC-FDMA), for the uplink (UL). For next generation radio access technologies, o OFDMA-based multicarrier modulation is an attractive uplink air interface because it allows for simplified receiver structures and enhanced interference cancelation schemes when the downlink air interface is also OFDMA based. However, a new multicarrier modulation scheme in the uplink also requires a redesign of resource element (RE) mapping when uplink control information (UCI) is transmitted together with data over a shared uplink channel. Described herein are methods and associated apparatuses to transmit uplink control information in an uplink shared channel based upon OFDMA waveforms.

BRIEF DESCRIPTION OF THE DRAWINGS

FIG. 5 illustrates RE numbering of UCI resources on OFDM symbols containing DMRS for an example DMRS pattern according to some embodiments.

FIG. 6 illustrates RE numbering of UCI resources on OFDM symbols containing DMRS for an example DMRS pattern with different mapping rules per slot according to some embodiments.

DETAILED DESCRIPTION

Figure 1:
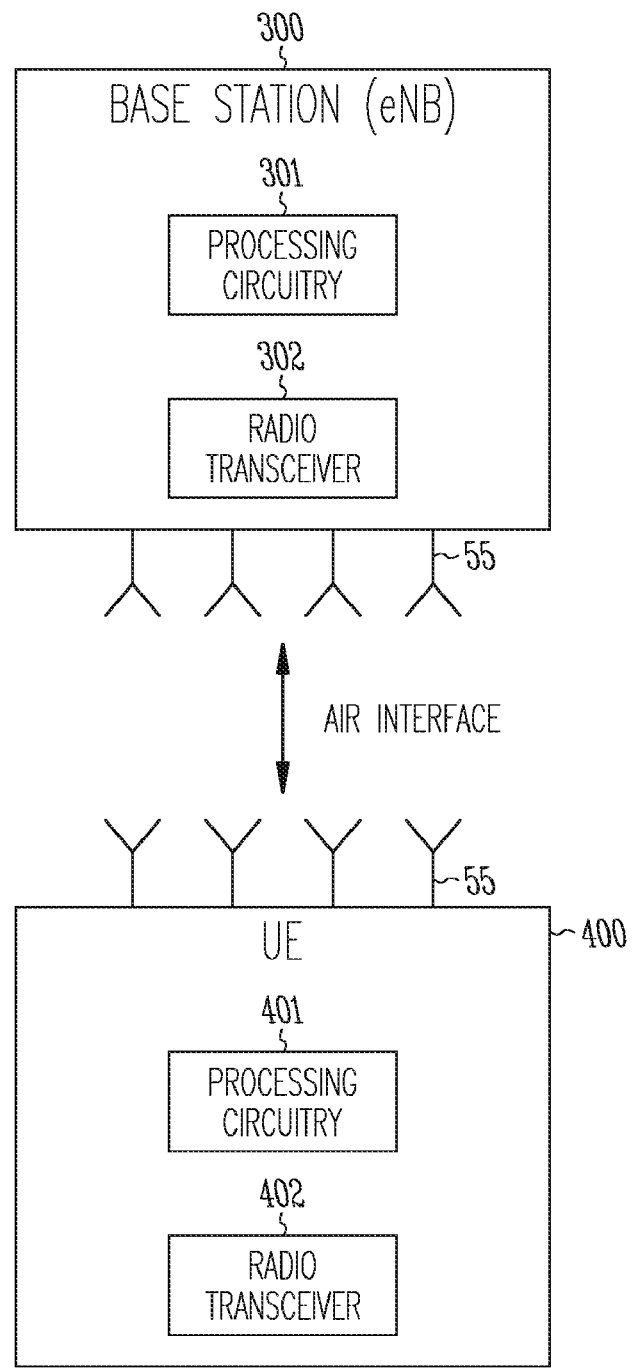
FIG. 1 illustrates an example UE and eNB according to some embodiments.

FIG. 1 illustrates an example of the components of a UE 400 and a base station or eNB 300. The eNB 300 includes processing circuitry 301 connected to a radio transceiver 302 for providing an air interface. The UE 400 includes processing circuitry 401 connected to a radio transceiver 402 for providing an interface. Each of the transceivers in the devices is connected to antennas 55.

The physical layer of LTE is based upon orthogonal frequency division multiplexing (OFDM) for the downlink and a related technique, single carrier frequency division multiplexing (SC-FDM), for the uplink. In OFDM/SC-FDM, complex modulation symbols according to a modulation scheme such as QAM (quadrature amplitude modulation) are each individually mapped to a particular OFDM/SC-FDM subcarrier transmitted during an OFDM/SC-FDM symbol, referred to as a resource element (RE). An RE is the smallest physical resource in LTE. LTE also provides for MIMO (multi-input multi-output) operation where multiple layers of data are transmitted and received by multiple antennas and where each of the complex modulation symbols is mapped into one of the multiple transmission layers and then mapped to a particular antenna port. Each RE is then uniquely identified by the antenna port, sub-carrier position, and OFDM symbol index within a radio frame as explained below.

LTE transmissions in the time domain are organized into radio frames, each having a duration of 10 ms. Each radio frame consists of 10 sub-frames, and each sub-frame consists of two consecutive 0.5 ms slots. Each slot comprises six indexed OFDM symbols for an extended cyclic prefix and seven indexed OFDM symbols for a normal cyclic prefix. A group of resource elements corresponding to twelve consecutive subcarriers within a single slot is referred to as a resource block (RB) or, with reference to the physical layer, a physical resource block (PRB).

A CE transmits a number of control signals to the eNB, referred to as uplink control information (UCI). The current LTE standards specify that a CE transmits a hybrid automatic request repeat acknowledgement (HARQ-ACK) signal over the uplink (UL) in response to data packet reception over the downlink (DL). Depending on whether the data packet reception is correct or incorrect, the HARQ-ACK signal has an ACK or a NAK value, respectively. The UE transmits a scheduling request (SR) signal to request UL resources for signal transmission. The UE transmits channel state information (CSI) reports that include a channel quality indicator (CQI) signal to inform the eNB of the DL channel conditions it experiences, enabling the eNB to perform channel-dependent scheduling of DL data packets. The UE also transmits precoder matrix indicator/rank indicator (PMI/RI) signals as part of the CSI to inform the eNB how to combine the transmission of a signal to the UE from multiple eNB antennas in accordance with a Multiple-Input Multiple-Output (MIMO) principle. Any of the possible combinations of HARQ-ACK, SR, CQI, PMI, and RI signals may be transmitted by a UE jointly with data information in the physical uplink shared channel (PUSCH), or separate from data information in the physical uplink control channel (PUCCH).

In current LTE systems, uplink control information (UCI) such as channel state information (CSI) or HARQ ACK/NACK feedback can be transmitted on either the physical uplink control channel (PUCCH) or the physical uplink shared channel (PUSCH). In the latter case, UCI needs to be multiplexed with uplink shared channel (UL-SCH) data. In addition, each PUSCH transmission is accompanied by demodulation reference signals (DMRS) to allow demodulation of the PUSCH symbols at the receiver. The mapping of DMRS, UCI and UL-SCH data to physical resources is tightly interconnected. For example, UCI transmission is generally more protected than data transmission as an unsuccessful UCI transmission could potentially trigger a downlink re-transmission or result in sub-optimal adaptive modulation and coding (AMC). Hence, ACK/NACK bits may be mapped to resource elements (REs) in the time/frequency resource grid that are adjacent to DMRS as is the case in LTE.

As noted above, the uplink air interface for current LTE systems is based on SC-FDMA. SC-FDMA waveforms exhibit several benefits foremost among them a low peak-to-average power ratio (PAPR). Low PAPRs allow for more efficient operation of the user equipment's (UE's) power amplifier (PA). An asymmetric design, i.e., where uplink and downlink use different waveforms, may no longer be justified by this improved PA efficiency, however, as the benefits of a symmetric uplink/downlink air interface may outweigh those of SC-FDMA. For example, in current LTE systems, a UE may need to implement both an OFDMA receiver and an SC-FDMA receiver to receive downlink transmissions from an eNB and device-to-device transmissions from another UE, respectively. In addition, for highly dynamic flexible duplex systems, i.e., where downlink and uplink are no longer frequency-division duplexed (FDD) in separate bands or time-division duplexed (TDD) in separate subframes, it may be beneficial to use symmetric DMRS patterns in either duplex direction to allow for sophisticated, possibly network assisted, interference cancelation and mitigation schemes.

In current LTE systems, each slot of an uplink subframe contains one SC-FDMA symbol dedicated to DMRS transmission. Let $M_{sc}$ be the transmission bandwidth of the physical uplink shared channel (PUSCH) which occupies $N_{PRB}$ physical resource blocks (PRBs) in the time/frequency resource grid of LTE, i.e., $M_{sc}=12$ $N_{PRB}$. Then the UE transmits $M_{sc}$ DMRS symbols in each slot of the PUSCH transmission. Consequently, DMRS REs and data or UCI REs never share the same resources in the time or frequency domain: DMRS symbols are transmitted on all subcarriers of a SC-FDMA symbol carrying DMRS. The downlink DMRS pattern, on the other hand, since OFDMA does not need to maintain the single-carrier property of SC-FDMA, can be less restrictive so that data, UCI, and DMRS symbols can be multiplexed onto different subcarriers of a given OFDM symbol. In the downlink, however, downlink control information (DCI) is always transmitted on a dedicated physical downlink control channel (PDCCH) and never multiplexed onto the physical downlink shared channel (PDSCH). No multiplexing schemes for UCI on PUSCH with generic DMRS patterns are thus known. Hence, for a symmetric UL/DL design with OFDMA waveforms in either duplex direction, a novel RE mapping scheme is needed. Moreover, the multiplexing of UCI and UL-SCH data should preserve most of the performance benefits of SC-FDMA while at the same time be generic enough to accommodate a vast array of different DMRS patterns.

In the embodiments described below, UCI is transmitted over an OFDMA-based uplink. In some embodiments, UCI symbols are mapped to resource elements (REs) in the time/frequency resource grid to maximize frequency diversity. In addition, UCI can be mapped taking into account channel estimation performance by mapping UCI symbols to those REs that are closest (in terms of OFDM subcarriers/symbols) to DMRS carrying REs. Mapping of UCI to REs can take into account whether an OFDM symbol also carries DMRS or simply UL-SCH data. Mapping of UCI to REs can also take into account dynamic DMRS patterns that change from subframe to subframe according to pre-specified rules or as indicated in the downlink control information (DCI) scheduling the PUSCH associated with the DMRS. Mapping of UCI to REs may also be made to depend on the UCI payload size. The types of UCI that are mentioned throughout the embodiments described below (e.g., HARQ-ACK/NACK, CSI, RI, PMI, and SR) are illustrative, and other types of UCI should not be construed as precluded from those embodiments.

Figure 2:
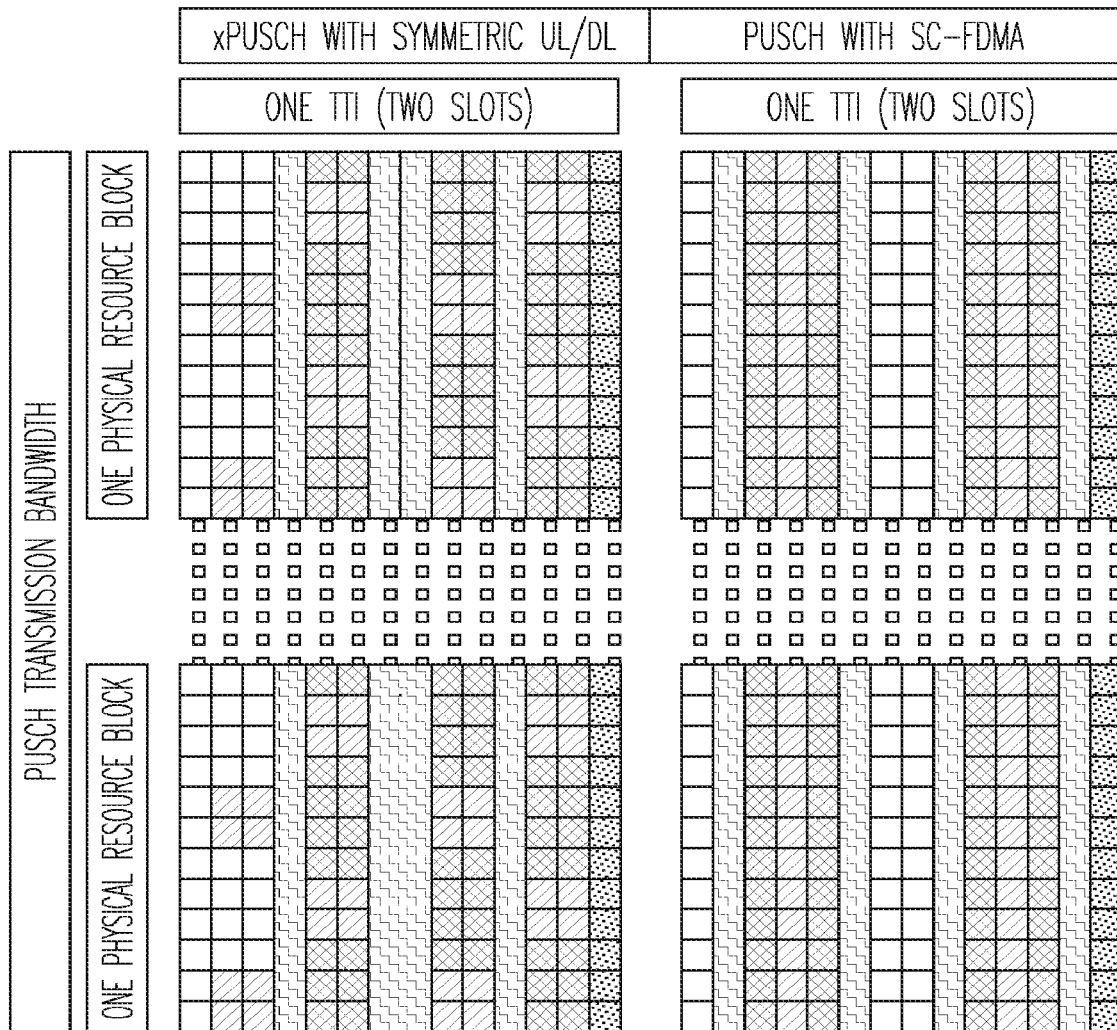
FIG. 2 illustrates a PUSCH with symmetric UL/DL and a PUSCH with SC-FDMA according to some embodiments.

FIG. 2 shows an example of the PUSCH RE mapping for a symmetric UL/DL waveform based on OFDMA and the LTE PUSCH RE mapping for the SC-FDMA waveform, respectively. Now referring to the right-hand part of FIG. 2, in a legacy LTE system DMRS occupies the entire transmission bandwidth on symbol four of each slot (for normal cyclic prefix), as depicted in FIG. 2. Modulated HARQ ACK/NACK bits, if present, are then mapped into the resources directly adjacent to the DMRS carrying SC-FDMA symbol. The number of ACK/NACK information carrying symbols depends on the UE higher layer configuration and the transmission parameters of the UL-SCH data with which the HARQ ACK/NACK bits are multiplexed. Next, rank indicator bits, if present, are mapped to the SC-FDMA symbol adjacent to the resources reserved for HARQ ACK/NACK transmission, as depicted in FIG. 2. Lastly, channel quality indicator (CQI) bits, if present, are first multiplexed with the UL-SCH data and then mapped to the time/frequency resources not yet occupied by DMRS, sounding reference signal (SRS), RI (if present) and HARQ-ACK/NACK UCI (if present).

Referring to the left-hand side of FIG. 2, for UL OFDMA waveforms the DMRS mapping may not be as regular as in the case of SC-FDMA. For example, UL OFDMA waveforms need not maintain the single-carrier property of SC-FDMA. Hence, in order to maximize spectral efficiency, a DMRS pattern for the PUSCH similar to the one in FIG. 2 may be adopted. Note, however, that the DMRS pattern depicted here merely serves as an example and other DMRS patterns are not precluded. In addition, the number of sub-carriers and OFDM symbols per physical resource block (PRB) depicted in FIG. 2 also merely serve as an example. For instance, the number of OFDM symbols, may differ from the one above if the network configures an extended cyclic prefix (CP). Consequently, the DMRS pattern may look different from the example one in FIG. 2.

One feature of DMRS patterns for multi-carrier modulation schemes such as OFDMA is that for a given OFDM symbol some sub-carriers within one physical resource block (PRB) may contain DMRS REs whereas others may not. This cannot occur in SC-FDMA based DMRS patterns. Hence, existing rules on how to map UCI and UL-SCH data for PUSCH transmissions no longer apply. Described herein are novel RE mapping schemes that allow to multiplex UCI and UL-SCH data within a PUSCH transmission based on UL OFDMA waveforms. Moreover, the proposed UCI mapping schemes are not static but rather rule based in order to facilitate dynamic adaptation of the UCI mapping in case the DMRS pattern changes, e.g., through subframe dependent pre-specified rules or through dynamic indication in the downlink control information. Additionally, in some embodiments, such dynamic adaptation of the UCI mapping may also be determined depending on the UCI payload size as is the case in self-contained frame structures or during simultaneous or subsequent transmissions of xPUSCH and xPUCCH within the same subframe.

In one embodiment, different kinds of UCI are mapped onto different OFDM symbols. To this end, OFDM symbols within one PRB are grouped by whether they contain DMRS REs or not. One such example is given in FIG. 2. In the first slot, symbols #4 and #7 are reserved for rank indication (RI) where the symbols in each slot are numbered from 1 to 7. In the second slot, symbols #1 and #4 are reserved for rank indication. In this example, the last OFDM symbol of the second slot is not included assuming it can be used to transmit sounding reference signals (SRS). Similarly, the first symbol of the first slot is not included such that the total number of REs reserved for potential RI transmission is the same as in LTE, namely, $4M_{sc}$. Since the depicted DMRS pattern simply serves as an example for ease of exposition, other time/frequency resources for RI transmission are not precluded. Similarly, a second set of resources is reserved for HARQ ACK/NACK transmission, namely, those OFDM symbols which also contain DMRS REs. In the example in FIG. 2, symbols #5 and #6 are reserved in the first slot and symbols #2, #3, #5, #6 are reserved in the second slot. Symbols #2 and #3 in the first slot are not included such that the total number of REs reserved for potential HARQ ACK/NACK transmission is the same as in LTE, namely, $4M_{sc}$. Since the depicted DMRS pattern simply serves as an example for ease of exposition, other time/frequency resources for HARQ ACK/NACK transmission are not precluded. In another embodiment, OFDM symbols carrying DMRS are reserved for potential rank indication transmission whereas OFDM symbols not carrying DMRS are reserved for potential HARQ ACK/NACK feedback transmission.

In any of the embodiments described herein, CQI information may be multiplexed with UL-SCH data prior to RE mapping. In either embodiment, UL-SCH and CQI data may be mapped first in the frequency domain, e.g., in increasing order of the subcarrier index, and then in the time domain, e.g., in increasing order of the OFDM symbol index. Alternatively, UL-SCH and CQI data may be mapped time-first, frequency-afterwards.

One potential drawback of frequency-first mapping for concatenated UL-SCH and CQI data is that CQI information cannot get frequency diversity gain in the presence of inter-slot frequency hopping. In order to exploit frequency diversity gain provided by frequency hopping, a hybrid RE mapping method may be employed for UL-SCH and CQI data mapping. In this embodiment, CQI data is mapped first in the time domain, e.g. in increasing order of the symbol index, and then in the frequency domain. UL-SCH data may be mapped in frequency domain first then in the time domain. This structure allows for a pipelined decoder architecture at eNB side for data in case of frequency-first mapping, while allowing for frequency diversity for CQI information in the presence of intra-subframe (i.e. slot-based) frequency hopping.

Assuming frequency-first mapping is applied, then in another embodiment, the CQI and UL-SCH data multiplexing is performed such that CQI information is first divided into multiple segments. Then, such segments are evenly distributed on two slots to get frequency diversity gain in the present of frequency hopping In this option, CQI information has applied to it a frequency-first mapping order as does UL-SCH data, but the CQI is effectively mapped to predetermined resources across two slots (e.g., a first OFDM symbol of each slot starting from lowest frequency index) to utilize the frequency hopping benefit.

In any of the embodiments described herein, the UE determines the actual number of REs used for UCI transmission by a combination of semi-statically configured and dynamically signaled parameters, respectively. For example, the actual number of REs used for UCI within an PUSCH allocation may depend on the UL-SCH payload, the UCI payload, the PUSCH transmission bandwidth, the SRS configuration, and/or UCI-specific offset parameters. Such parameters can be dynamically signaled to the UE in the downlink control information (DCI) that carries the UL grant for the UL-SCH data with which the UCI is multiplexed on the PUSCH. In addition, some of these parameters may also depend on the UE's higher layers which the eNB can control via the radio resource control (RRC) protocol.

In any of the embodiments described herein, the UE may first map the reference signals and sounding reference signals into the time/frequency resource grid. The UE then proceeds to map the modulated rank indicator bits to the respective resources. This may leave some of the resources reserved for RI transmission unoccupied. Next, the UE maps the modulated CQI bits to the remaining resources before it maps the modulated UL-SCH data to the resources not already occupied by DMRS, SRS, RI, or CQI. Lastly, the UE maps the modulated HARQ ACK/NACK bits to the resources reserved for HARQ ACK/NACK transmission potentially puncturing CQI and/or UL-SCH symbols.

Figure 3:
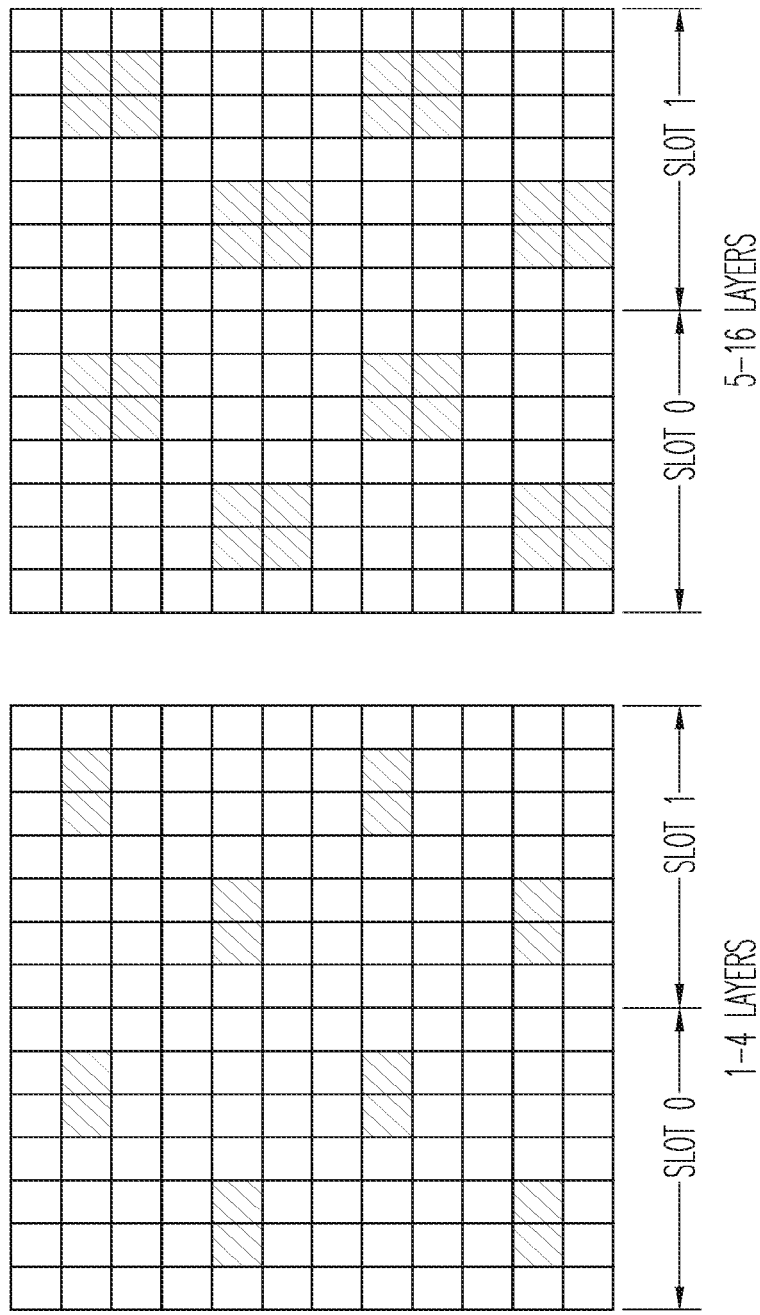
FIG. 3 illustrates an example of a DMRS pattern for different numbers of layers according to some embodiments.

In one embodiment, the UE always maps the UCI around the DMRS REs according to the number of layers used for the PUSCH transmission carrying the UCI. Referring to the example in FIG. 3, if the number of transmission layers is 1-4, the UE maps the UCI according to the left DMRS patterns, otherwise, if the number of transmission layers is larger than 4, the UE maps the UCI assuming the DMRS pattern on the right hand side of FIG. 3 which only serves as an example here for ease of exposition. In another embodiment, the UE always maps the UCI assuming the largest possible number of transmission layers. For example, even if the number of actual transmission layers is less than or equal to four, the UE may still assume the DMRS pattern on the right hand side of FIG. 3 when it maps the UCI.

Whenever the number of modulated UCI symbols of a specific kind (e.g., RI or HARQ ACK/NACK) is less than the number of reserved REs for the respective kind of UCI, a RE mapping scheme is needed to map the UCI to the reserved REs. In one embodiment, the number of modulated symbols for a specific UCI type (e.g., RI or HARQ ACK/NACK) is Q whereas the total number of REs reserved for that UCI type is $Q_{reserved}$. In order to map the Q symbols to the $Q_{reserved}$ resources, the REs reserved for the UCI type ($Q_{reserved}$ of them) are numbered in a consecutive cyclic manner from 1 to floor($Q_{reserved}$/Q) where the floor ( ) operator returns the largest integer number smaller than or equal to the input of the operator. One such example is given in FIG. 4 for $M_{sc}$=12, Q=7 and $Q_{reserved}$=48 on the left hand side of the figure. In this example: 1) UCI is always mapped assuming the largest number of possible transmission layers; 2) CQI is multiplexed with UL-SCH by first mapping the modulated CQI bits and then the modulated UL-SCH bits in a frequency-first, time-then manner; 3) modulated RI bits are mapped to OFDM symbols not containing DMRS REs; 4) modulated HARQ-ACK bits are mapped to OFDM symbols that contain DMRS REs; 5) SRS is transmitted on the last OFDM symbol; and, 6) the remaining REs are used to map the modulated UL-SCH bits.

Figure 4:
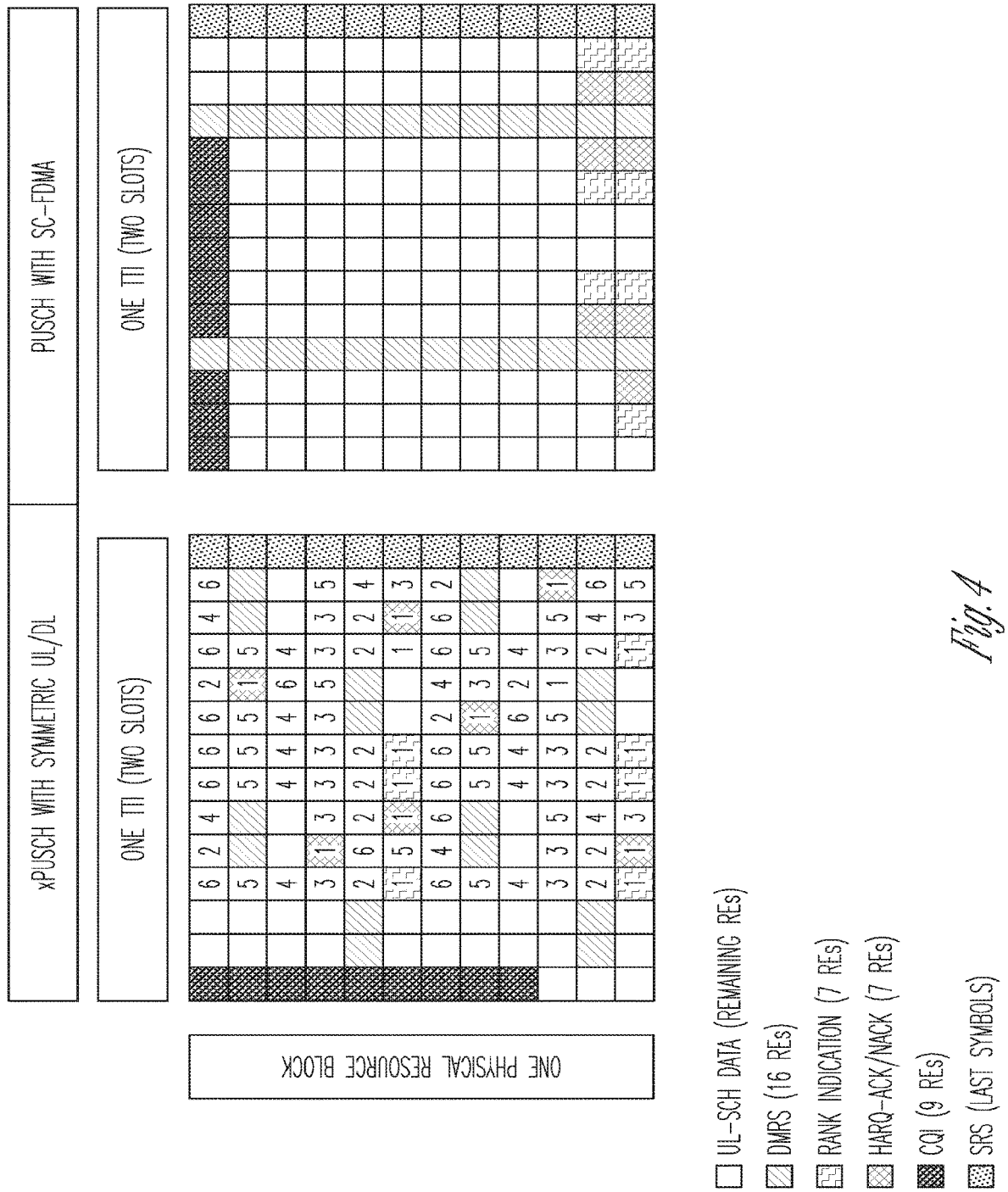
FIG. 4 illustrates RE mapping for UCI with symmetric UL/DL waveform according to some embodiments.

FIG. 4 also depicts how the mapping rule described above is different from SC-FDMA. Since the SC-FDMA waveform provides inherent frequency-diversity from spreading each symbol over the entire transmission bandwidth via a discrete Fourier transform (DFT) spreading operation, the potentially small number of RI and HARQ ACK/NACK symbols needs to be interleaved over the entire transmission bandwidth in the case of OFDMA waveforms. As can be seen from the example in FIG. 4, a simple numbering of REs reserved for a certain kind of UCI may result in clusters reducing the overall frequency diversity. For the case of $M_{sc}$=12, Q=7 and $Q_{reserved}$=48 all RI symbols, for instance, are mapped to just two sub-carriers.

In another embodiment, UCI is mapped to REs such that the clustering depicted in FIG. 4 cannot occur. Now focusing on the case where UCI is mapped to OFDM symbols not containing DMRS, the UE first computes a UCI step-size according to:

$$stepsize = \max\left\{floor\left(\frac{Q_{reserved}}{ceil\left(\frac{Q}{N_{UCI}}\right)}\right), 1\right\}$$

where the ceil( ) operator returns the smallest integer number larger than or equal to its input and $N_{UCI}$ is the number of OFDM symbols reserved for UCI transmission. The i-th modulated UCI symbol (i=0, . . . , Q−1) is then mapped to the k sub-carrier within the PUSCH transmission bandwidth on the l-th symbol according to:

$$l = i \bmod N_{UCI}$$
$$k = floor\left(\frac{i}{N_{UCI}}\right) \cdot stepsize + (i \bmod N_{UCI}) \cdot floor\left(\frac{stepsize}{N_{UCI}}\right)$$

Note that in the case where PUSCH is transmitted using frequency hopping, the sub-carrier indexing k may differ between two slots, i.e., k=0 may denote a different sub-carrier in the first and second slot depending on the frequency hopping configuration of the UE. In other words, sub-carriers are numbered from k=0 . . . $M_{sc}$ per slot of the PUSCH allocation.

Figure 5:
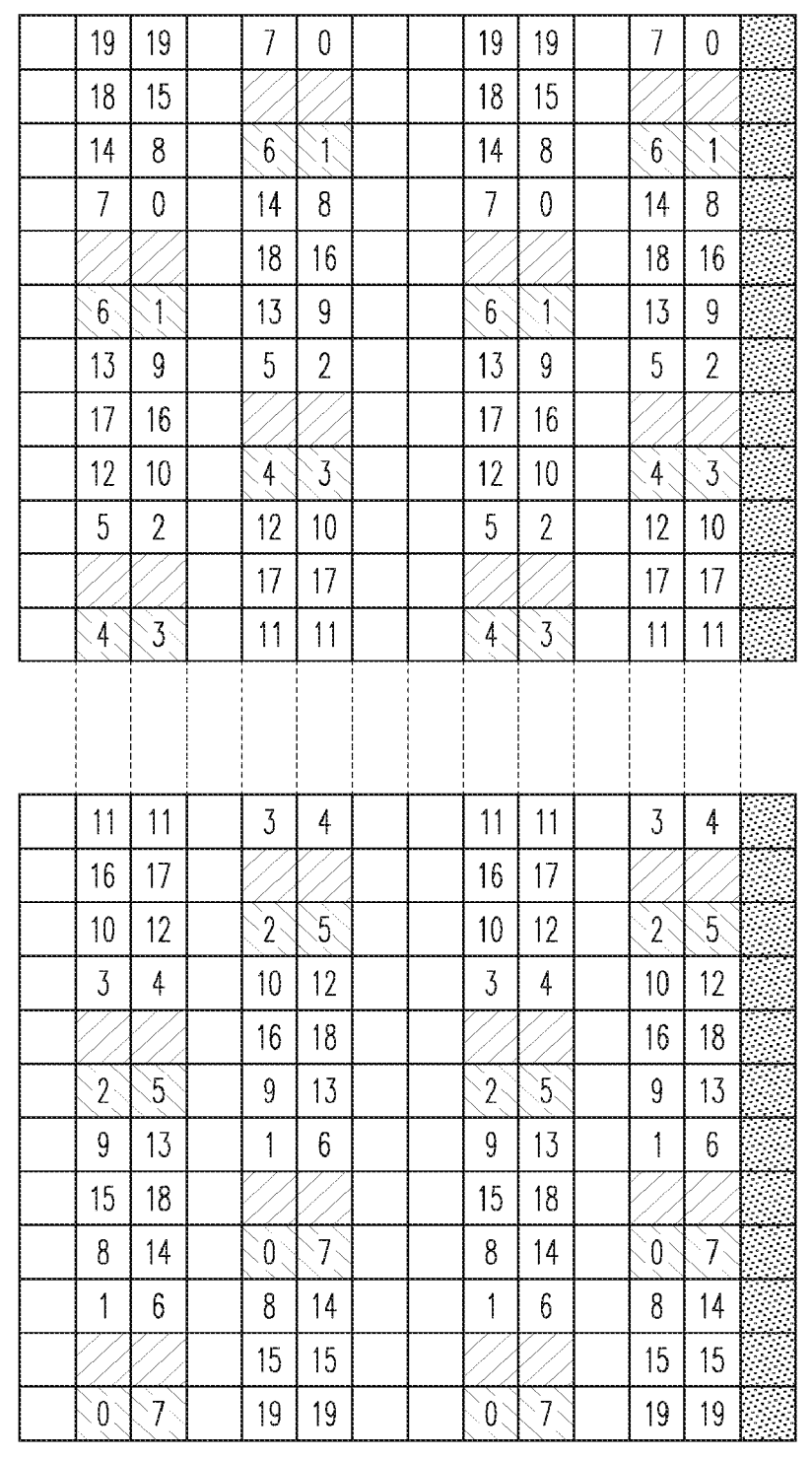

In another embodiment, UCI is mapped to REs depending on the relative position to REs carrying DMRS on the same OFDM symbol, i.e., UCI of a given type is only mapped to OFDM symbols with DMRS. In a first stage, for each OFDM symbol reserved for UCI transmission of the given type, the UE numbers all sub-carriers excluding sub-carriers containing DMRS in increasing order of the sub-carrier index by their distance (in numbers of sub-carriers) to the closest RE containing DMRS on the same OFDM symbol. This is illustrated on the second OFDM symbol in FIG. 5 for the exemplary DMRS pattern in FIG. 3. Note that in this case, the DMRS pattern for 1-4 layer transmissions is assumed so that UCI resources include the REs reserved for higher layer transmissions.

In another embodiment, the UE, in a first stage, numbers all sub-carriers excluding sub-carriers containing DMRS by their distance (in numbers of sub-carriers) to the closest RE containing DMRS on the same OFDM symbol whereas the starting sub-carrier is alternated between OFDM symbols reserved for UCI transmission of the given type. In the example in FIG. 5, the UE numbers the sub-carriers according to the specified rule in increasing order of sub-carrier indices on the first OFDM symbol reserved for UCI transmission of the given type, in decreasing order of sub-carrier indices on the second OFDM symbol reserved for UCI transmission of the given type, in increasing order of sub-carrier indices on the third OFDM symbol reserved for UCI transmission of the given type, and so forth.

Figure 6:
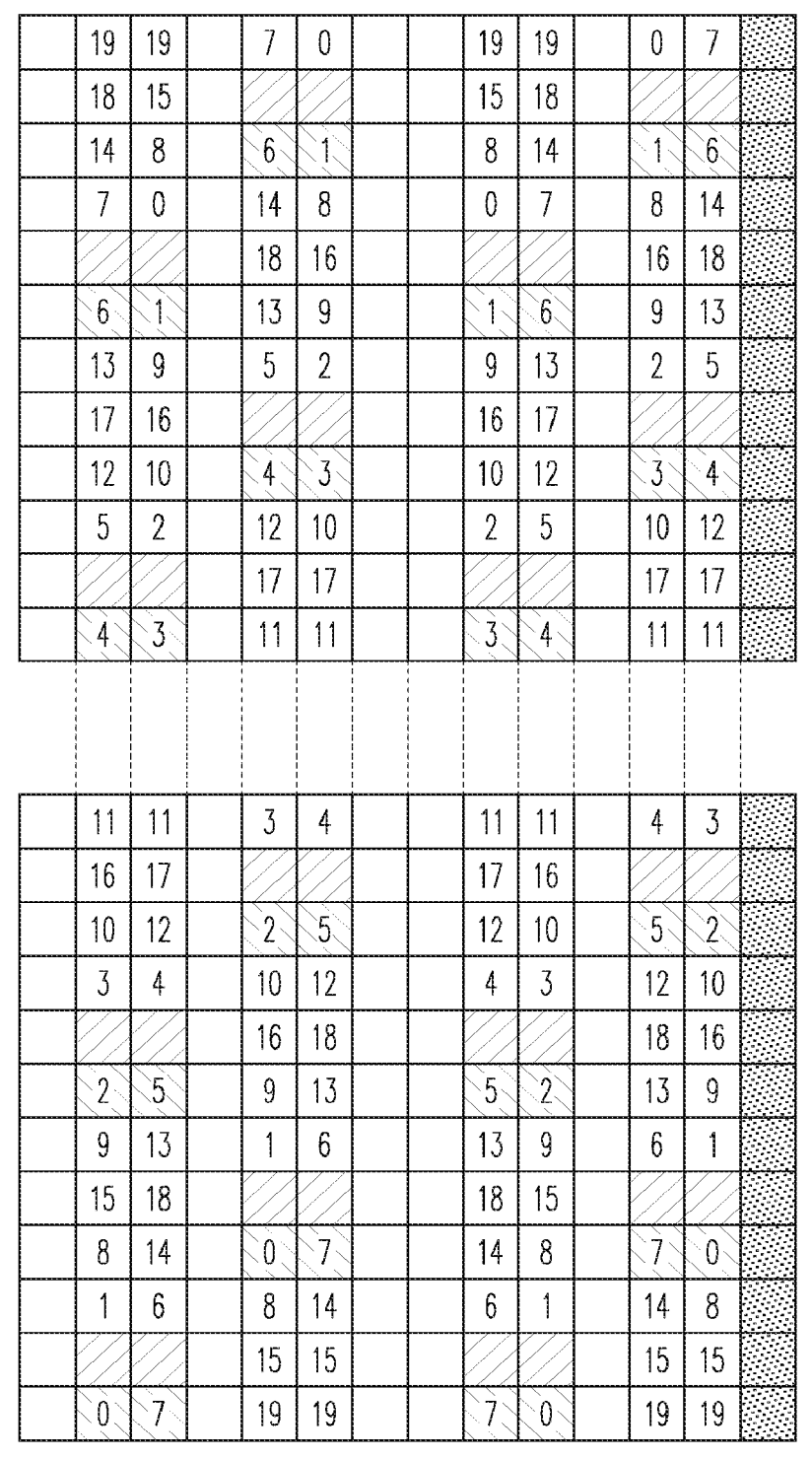

In another embodiment, the UE, in a first stage, numbers all sub-carriers excluding sub-carriers containing DMRS by their distance (in numbers of sub-carriers) to the closest RE containing DMRS on the same OFDM symbol whereas the starting sub-carrier is alternated between OFDM symbols reserved for UCI transmission of the given type and between slots. In the example in FIG. 6, the UE numbers the sub-carriers according to the specified rule in increasing order of sub-carrier indices on the first OFDM symbol reserved for UCI transmission of the given type in the first slot, in decreasing order of sub-carrier indices on the second OFDM symbol reserved for UCI transmission of the given type in the first slot, in increasing order of sub-carrier indices on the third OFDM symbol reserved for UCI transmission of the given type in the first slot, and so forth, whereas in the second slot, the UE numbers the sub-carriers according to the specified rule in decreasing order of sub-carrier indices on the first OFDM symbol reserved for UCI transmission of the given type, in increasing order of sub-carrier indices on the second OFDM symbol reserved for UCI transmission of the given type, in decreasing order of sub-carrier indices on the third OFDM symbol reserved for UCI transmission of the given type in the first slot, and so forth.

In any of the embodiments described above, the UE, in a second stage, may then numbers all resource elements reserved for UCI transmission of the given type from m=0 ... Qreserve$_d$−1 first by the index derived from the relative distance of the RE to a DMRS RE on the same symbol, then by the slot index in increasing order, and then by the OFDM symbol index in increasing order.

Figure 7:
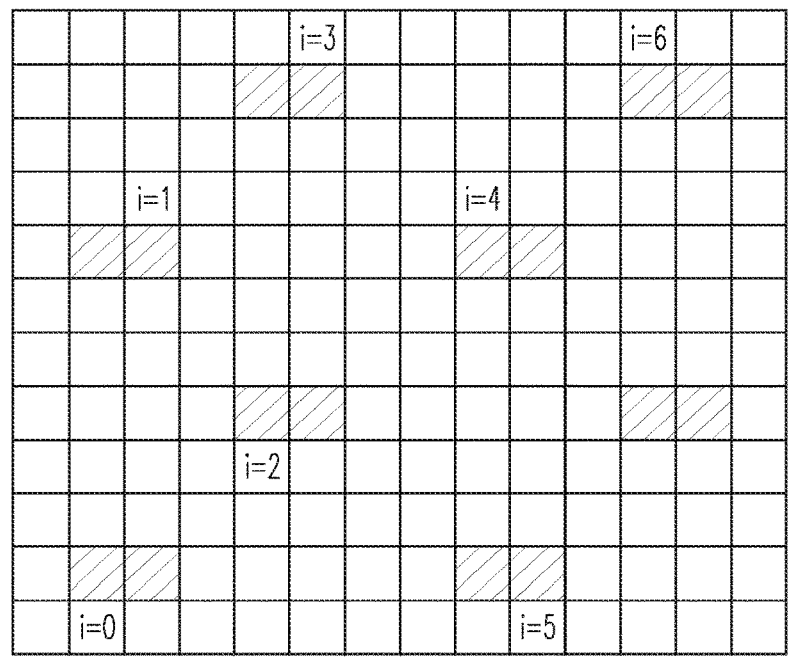
FIG. 7 illustrates an example of a UCI mapping based on distance to DMRS symbols according to some embodiments.

In another embodiment, in the second stage, to support transmit diversity based aperiodic UCI only transmission, in which the Space Frequency Block Coding (SFBC) may be used, the UE may number all resource elements reserved for UCI transmission in pairs. The numbering may be performed as in the following method: 1) first two continuous REs by the index derived from the relative distance of the RE to a DMRS RE on the same symbol, 2) then two continuous REs by the slot index in increasing order, and 3) then two continuous REs by the OFDM symbol index in increasing order. Lastly, in a third stage, the UE maps the Q modulated UCI symbols (i=0, . . . , Q−1) to the Q$_{reserved}$ REs by mapping the first modulated UCI symbol/=0 to the reserved RE indexed m=0, the second modulated UCI symbol i=1 to the reserved RE indexed m=1, the third modulated UCI symbol i=2 to the reserved RE numbered m=2, and so forth. In FIG. 7 an example is given in for the case of $M_{sc}$=12, Q=7, $Q_{reserved}$=48 and $N_{UCI}$=4. Note that it may be possible that the DMRS pattern dynamically changes from subframe to subframe either due to pre-specified rules or because of explicit signaling in the downlink control information (DCI) scheduling the associated PUSCH transmission. For example, in some subframes the DMRS pattern may shift by P symbols to the left/right to avoid collision with other synchronization or reference signal transmissions in the same subframe. In another example, the DMRS pattern may change because the number of transmission layers indicated in the DCI changes from subframe to subframe. In that case, the UCI RE mapping for UCI transmission on PUSCH dynamically adapts to the DMRS pattern in the given subframe.

Figure 8:
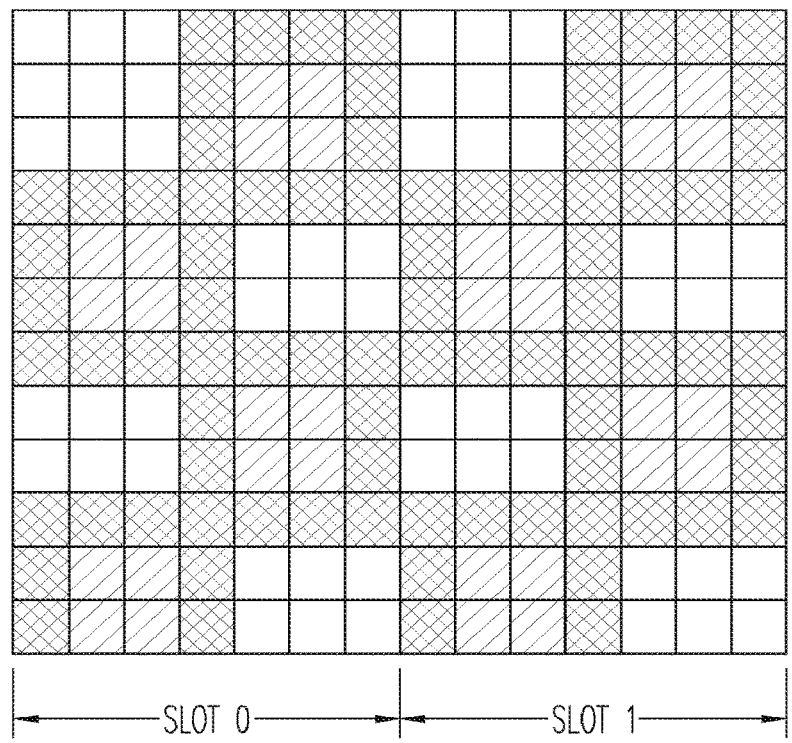
FIG. 8 illustrates an example of a DMRS pattern and associated UCI mapping based on proximity to DMRS REs according to some embodiments.

In another embodiment, UCI is mapped to REs in the time/frequency grid solely based on proximity to DMRS carrying REs without consideration of whether a given OFDM symbol contains DMRS REs or not. An example of such a UCI-to-RE mapping is given in FIG. 8.

UL-SCH data and UCI may also be transmitted simultaneously in the subframe by configuring both a dedicated PUSCH for UL-SCH data and a dedicated physical uplink control channel (PUCCH) in the same subframe. In one embodiment, a PUCCH is transmitted adjacent to a PUSCH where the PUCCH and PUSCH may be frequency-division multiplexed or time-division multiplexed. This may be appropriate for certain scenarios, e.g., when CQI or CSI feedback is multiplexed together with data in the same subframe. In this case, localized PUCCH transmission can help improve the performance.

Figure 9:
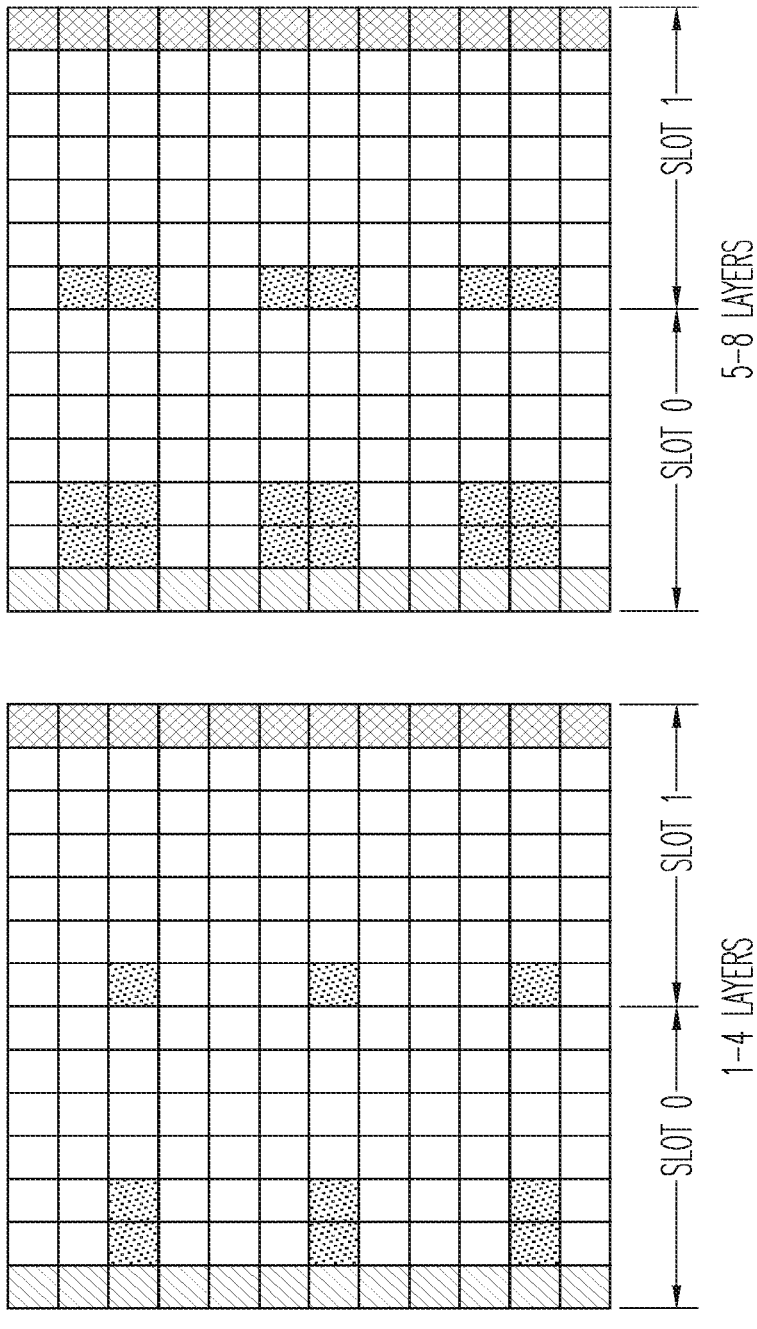
FIG. 9 shows an example of a transmission-layer dependent DMRS pattern for subframes with time-multiplexed PUSCH and PUCCH regions according to some embodiments.
Figure 10:
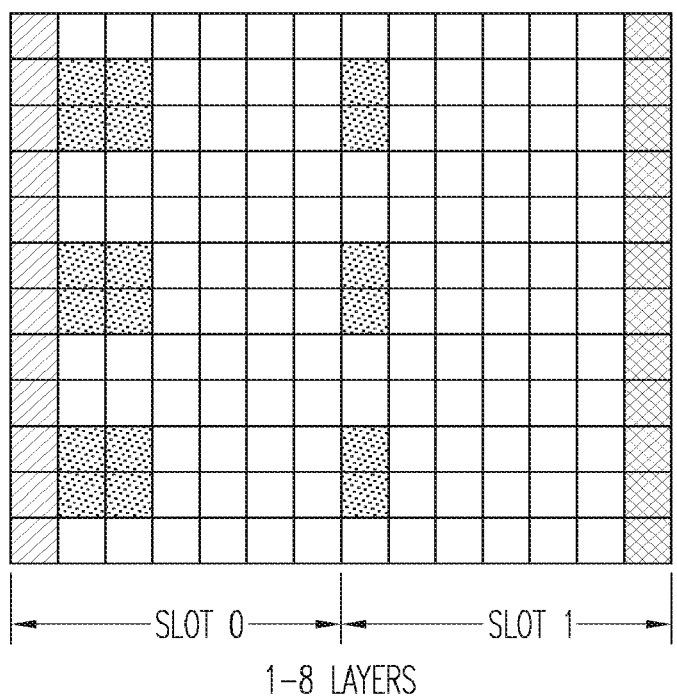
FIG. 10 shows an example of a transmission-layer independent DMRS pattern for subframes with time-multiplexed PUSCH and PUCCH regions according to some embodiments.
Figure 11:
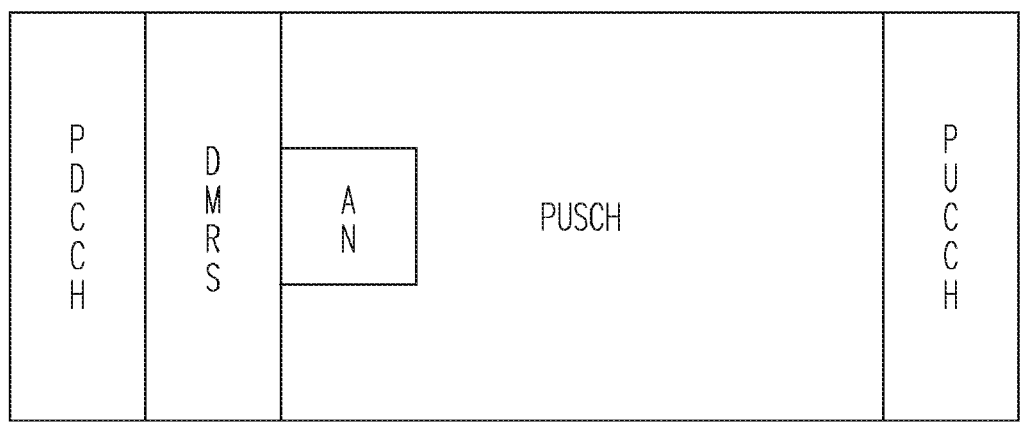
FIG. 11 shows an example of a DMRS pattern for subframes with time-multiplexed PUSCH and PUCCH regions according to some embodiments.

In another embodiment, a PUCCH is transmitted before or after the PUSCH but within the same subframe. For example, PUCCH and PUSCH transmissions may be time-division multiplexed (TDM) with DMRS patterns as illustrated in FIGS. 9 through 11.

Especially for the UCI that pertains to channel state information (CSI), another option is to include the CQI and/or RI into the data packet together with the UL-SCH bits. In one embodiment, the medium access control (MAC) header of the corresponding transport block indicates whether CQI and/or RI are present in the payload part. CQI and/or RI may be separately encoded and protected through cyclic redundancy check (CRC). In this option the resource mapping follows the data packet only and is not defined separately for data and UCI that is included in the payload of the corresponding transport block.

In another embodiment, the mapping of UCI depends on the payload size of some or all UCI to be transmitted within one subframe. For example, for subframes with both PUSCH and PUCCH transmissions from the same UE (e.g., as illustrated in FIGS. 9 through 11), HARQ ACK/NACK bits may always be transmitted on the PUCCH. The PUCCH resources may be semi-statically configured (i.e., certain symbols in certain subframes are always allocated for PUCCH transmissions) or dynamically signaled (e.g., via layer 1 downlink control information or layer 2 MAC control elements). Other UCI, however, such as CSI, rank indication, or measurement reports, may always be transmitted on the PUSCH.

In another example, in addition to HARQ ACK/NACK bites, periodic CSI is also always transmitted on the PUCCH irrespective of whether PUSCH transmissions by the same UE occur within the same subframe as the PUCCH transmission. In the case where some UCI in always transmitted on the PUCCH, an UL grant may be required for the UE to submit other UCI on the PUSCH. In the examples mentioned above, where some UCI is transmitted on the PUSCH, such UCI may be mapped to resource elements in the time/frequency resource grid according to the embodiments described elsewhere in this document.

In another embodiment, all UCI is always transmitted on the PUSCH even if the UE has a valid PUCCH resource allocation within the same subframe. In one example, the PUSCH that carries all the UCI within a given subframe is scheduled by an eNB. In another example, some subframes are semi-statically configured for UCI transmission on the PUSCH. In another example, the eNB instructs the UE by means of downlink control information (DCI) whether to transmit UCI on the PUTSCH or PUCCH. For example, in a subframe allocated for UCI transmission to a certain UE, if the UE receives downlink control information of one type, the UE only transmits UL-SCH data on the PUSCH and transmits the UCI on the PUCCH. In another example, in a subframe allocated for UCI transmission to a certain UE, if the UE receives downlink control information of another type, it multiplexes UL-SCH data and UCI and transmits the UCI on the PUSCH. In these examples, only some of the UCI may be transmitted on the PUSCH (with or without multiplexing the UCI with UL-SCH data) whereas other UCI is transmitted in the PUCCH. In particular, a UE may always transmit HARQ ACK/NACK bits on the PUCCH whereas other UCI is transmitted on the PUSCH with or without multiplexing the other UCI with UL-SCH data.

Example UE Description

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry tray include logic, at least partially operable in hardware.

Figure 12:
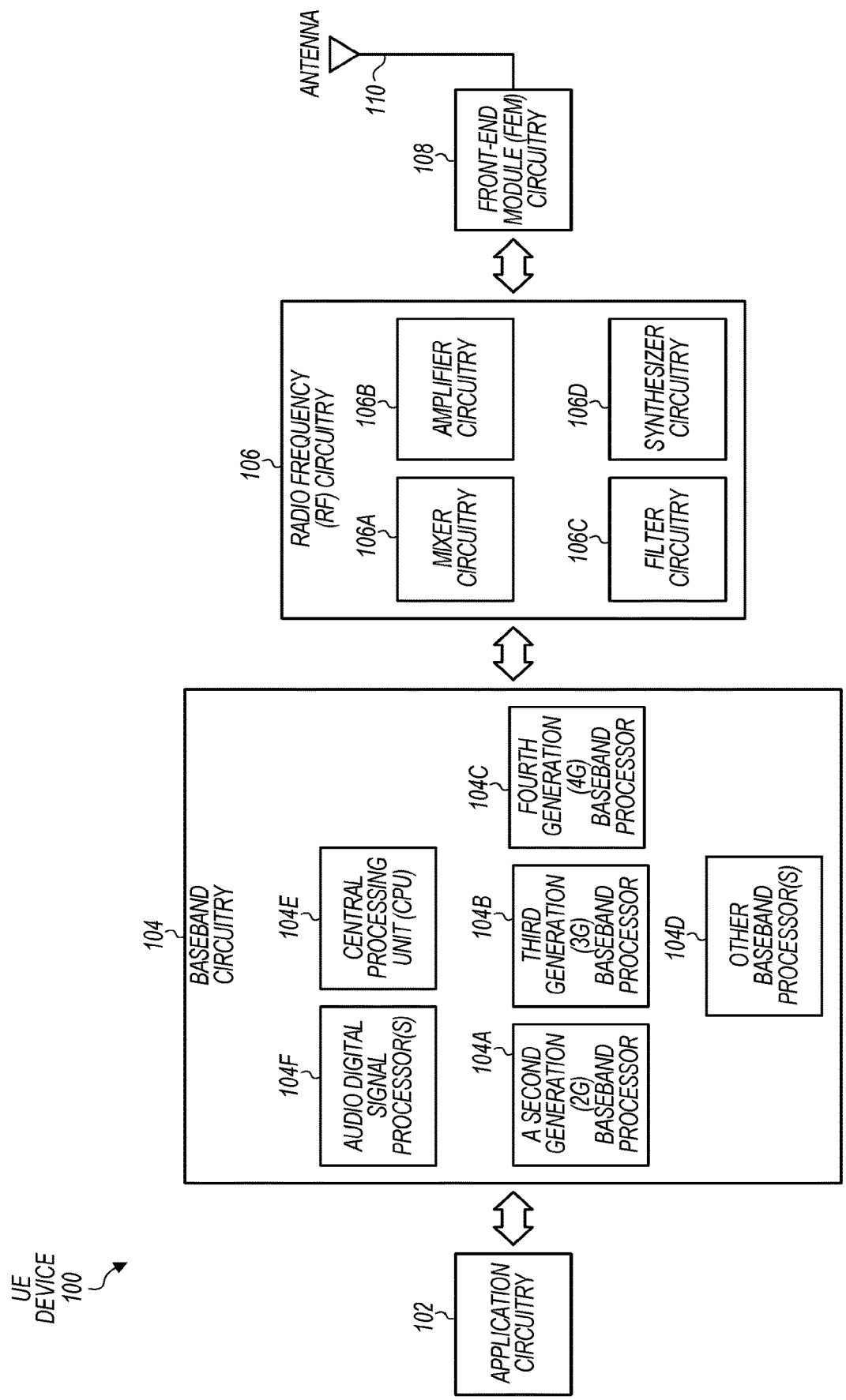
FIG. 12 illustrates an example of a user equipment device according to some embodiments.

Embodiments described herein may be implemented into a system using any suitably configured hardware and/or software. FIG. 12 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RE circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the LIE device 100 may include additional elements such as, for example, memory/storage, display, camera, sensor, and/or input/output (I/O) interface.

Example Machine Description

Figure 13:
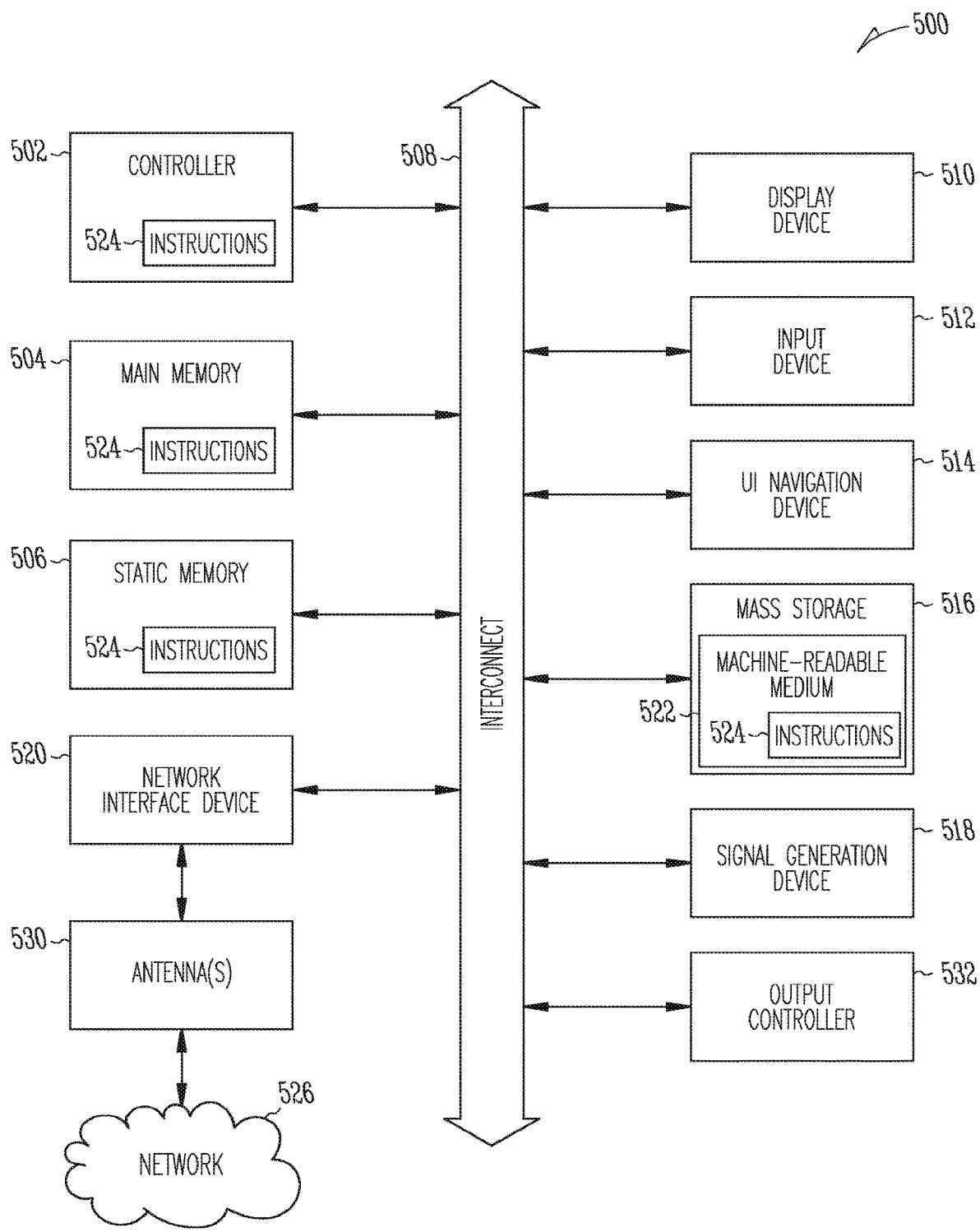
FIG. 13 illustrates an example of a computing machine according to some embodiments.

FIG. 13 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UNITS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes and Examples

In Example 1, an apparatus for a UE (user equipment) comprises: memory and processing circuitry; wherein the memory and processing circuitry are configured to: encode uplink control information (UCI) multiplexed with uplink shared channel (UL-SCH) data for transmission over a shared orthogonal frequency division multiple access (OFDMA) channel in physical resource blocks (PRBs) of a subframe containing a plurality of time-frequency resource elements (REs); map a first type of UCI selected from hybrid automatic request repeat acknowledgement (HARQ-ACK) signals or channel state information (CSI) signals to REs of OFDM symbols of the subframe that also contain demodulation reference signal (DMRS) REs; and, map a second type of UCI distinct from the first type selected from hybrid automatic request repeat acknowledgement (HARQ-ACK) signals or channel state information (CSI) signals to REs of OFDM symbols of the subframe that do not contain demodulation reference signal (DMRS) REs.

In Example 2, the subject matter of any of the Examples herein may further include wherein the memory and processing circuitry and are to map HARQ-ACK signals to REs of OFDM symbols of the subframe that do not contain DMRS REs and to map rank indicator (RI) signals to REs of OFDM symbols of the subframe that also contain DMRS REs.

In Example 3, the subject matter of any of the Examples herein may further include wherein the memory and processing circuitry to map HARQ-ACK signals to REs of OFDM symbols of the subframe that also contain DMRS REs and to map rank indicator (RI) signals to REs of OFDM symbols of the subframe that do not contain DMRS REs In Example 4, the subject matter of any of the Examples herein may further include wherein the memory and processing circuitry are to map CSI signals not mapped to REs of OFDM symbols containing DMRS REs to other REs of the subframe in accordance with their distance from DMRS REs.

In Example 5, an apparatus for a UE (user equipment) or any of the Examples herein, comprises: memory and processing circuitry; wherein the memory and processing circuitry are to: encode uplink control information (UCI) multiplexed with uplink shared channel (UL-SCH) data for transmission over a shared orthogonal frequency division multiple access (OFDMA) channel in physical resource blocks (PRBs) of a subframe containing a plurality of time-frequency resource elements (REs); and, multiplex channel quality information (CQI) with UL-SCH data prior to RE mapping.

In Example 6, the subject matter of any of the Examples herein may further include wherein the memory and processing circuitry to map the channel quality information (CQI) concatenated with UL-SCH data to REs of the PRB first in the frequency domain and then in the time domain.

In Example 7, the subject matter of any of the Examples herein may further include wherein the memory and processing circuitry to map the channel quality information (CQI) concatenated with UL-SCH data to REs of the PRB first in the time domain and then in the frequency domain.

In Example 8, the subject matter of any of the Examples herein may further include wherein the memory and processing circuitry are to map the channel quality information (CQI) to REs of the PRB first in the time domain and then in the frequency domain and to map UL-SCH data to REs of the PRB first in the frequency domain and then in the time domain.

In Example 9, the subject matter of any of the Examples herein may further include wherein the memory and processing circuitry are to divide the channel quality information (CQI) into multiple segments, to map the CQJ segments to REs of the PRB first in the frequency domain and then in the frequency domain such that the segments are evenly distributed across the two slots of the subframe, and to map UL-SCH data to REs of the PRB first in the frequency domain and then in the time domain.

In Example 10, the subject matter of any of the Examples herein may further include wherein the memory and processing circuitry are to multiplex CQI with UL-SCH data by first mapping modulated CQI bits and then modulated UL-SCH bits in a frequency-first, time-afterwards manner; map modulated rank indicator (RI) bits to OFDM symbols not containing demodulation reference signal (DMRS) REs; map modulated HARQ-ACK bits to OFDM symbols that contain DMRS REs; map sounding reference signals (SRS) to the last OFDM symbol of the subframe; and, map modulated UL-SCH data bits to remaining REs of the subframe.

In Example 11, the subject matter of any of the Examples herein may further include wherein the memory and processing circuitry are to map UCI to REs assuming a DMRS pattern corresponding to the largest possible number of transmission layers.

In Example 12, an apparatus for a UE (user equipment) comprises: memory and processing circuitry; wherein the memory and processing circuitry are configured to: encode uplink control information (UCI) multiplexed with uplink shared channel (UL-SCH) data for transmission over a shared orthogonal frequency division multiple access (OFDMA) channel in physical resource blocks (PRBs) of a subframe containing a plurality of time-frequency resource elements (REs), wherein the shared OFDMA channel includes a physical uplink shared channel (PUSCH) and a physical uplink control channel (PUCCH); if the UE receives downlink control information of one type, encode the UL-SCH data on the PUSCH and encode the UCI on the PUCCH and, if the UE receives downlink control information of another type, encode the UL-SCH data and UCI on the PUSCH.

In Example 13, the subject matter of any of the Examples herein may further include wherein the memory and processing circuitry are to time-division multiplex the PUCCH and the PUSCH.

In Example 14, the subject matter of any of the Examples herein may further include wherein the memory and processing circuitry are to frequency-division multiplex the PUCCH and the PUSCH.

In Example 15, the subject matter of any of the Examples herein may further include wherein the memory and processing circuitry are to map HARQ ACK/NACK bits to the PUCCH and map other UCI to the PUSCH.

In Example 16, a computer-readable medium comprises instructions to cause a user equipment (UE), upon execution of the instructions by processing circuitry of the UE, to perform any of the functions of the memory processing circuitry as recited in Examples 1 through 15.

In Example 17, a method for operating a UE comprises performing any of the functions of the memory and processing circuitry and transceiver as recited in any of Examples 1 through 15.

In Example 18, an apparatus for a UE comprises means for performing any of the functions of the memory and processing circuitry and transceiver as recited in any of Examples 1 through 15.

In Example 19, the subject matter of any of the Examples herein may further include a radio transceiver connected to the memory and processing circuitry.

In Example 20, the subject matter of any of the Examples herein may further include wherein the processing circuitry comprises a baseband processor.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the invention is not limited in this respect. An example LTE system includes a number of mobile stations, defined by the LTE specification as User Equipment (UE), communicating with a base station, defined by the LTE specifications as an eNB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to 1/10 of a wavelength or more.

In some embodiments, a receiver as described herein may be configured to receive signals in accordance with specific communication standards, such as the Institute of Electrical and Electronics Engineers (IEEE) standards including IEEE 802.11 standards and/or proposed specifications for WLANs, although the scope of the invention is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16 (m) standards for wireless metropolitan area networks (WMANs) including variations and evolutions thereof, although the scope of the invention is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus, comprising:
at least one processor configured to cause a base station (BS) to:
encode, for transmission to a user equipment (UE), downlink control information (DCI) scheduling a transmission including uplink shared channel (UL-SCH) data;
receive, from the UE, the transmission including UL-SCH data;
extract, from the transmission, uplink control information (UCI) multiplexed with the UL-SCH data from orthogonal frequency division multiplexing (OFDM) symbols in a time domain and in one or more physical resource blocks (PRBs) in a frequency domain, wherein the OFDM symbols and one or more PRBs include a plurality of time-frequency resource elements (REs);

wherein the transmission includes:
  demodulation reference signals (DMRS) mapped to REs in a set of OFDM symbols of the transmission, wherein the set of OFDM symbols is according to the DCI;
  first UCI mapped to REs of the OFDM symbols, wherein mapping of the first UCI depends on a position of the DMRS, wherein said mapping includes the first UCI mapped to REs first in the frequency domain and then in the time domain; and
  the UL-SCH data mapped to REs of the one or more PRBs first in the frequency domain and then in the time domain after mapping the first UCI.

2. The apparatus of claim 1, wherein the UL-SCH data is mapped to remaining REs that do not contain first UCI or DM-RS.

3. The apparatus of claim 1, wherein the first UCI includes channel state information (CSI).

4. The apparatus of claim 3, wherein the first UCI includes hybrid automatic repeat request acknowledgement (HARQ-ACK) information.

5. The apparatus of claim 3, wherein the transmission includes second UCI, wherein the second UCI comprises hybrid automatic repeat request acknowledgement (HARQ-ACK) information, and wherein the HARQ ACK information is mapped to REs reserved for HARQ-ACK information after the mapping of the UL-SCH data.

6. The apparatus of claim 5, wherein the HARQ-ACK information punctures the first CSI mapped to the REs of the OFDM symbols.

7. The apparatus of claim 5, wherein the HARQ-ACK information punctures the UL-SCH data mapped to the REs of the one or more PRBs.

8. The apparatus of claim 1, wherein OFDM symbols to which the DMRS are mapped are set dynamically in accordance with the DCI that schedules a physical uplink shared channel (PUSCH) that carries the UL-SCH data.

9. The apparatus of claim 8, wherein the symbols to which the DMRS are mapped are shifted within the OFDM symbols of a slot.

10. A cellular base station, comprising:
  one or more antennas;
  transceiver circuitry; and
  at least one processor communicatively coupled to the transceiver circuitry and configured to cause the cellular base station to:
  encode, for transmission to a user equipment (UE), downlink control information (DCI) scheduling a transmission including uplink shared channel (UL-SCH) data;
  receive, from the UE, the transmission including UL-SCH data;
  extract, from the transmission, uplink control information (UCI) multiplexed with the UL-SCH data from orthogonal frequency division multiplexing (OFDM) symbols in a time domain and in one or more physical resource blocks (PRBs) in a frequency domain, wherein the OFDM symbols and one or more PRBs include a plurality of time-frequency resource elements (REs);
  wherein the transmission includes:
    demodulation reference signals (DMRS) mapped to REs in a set of OFDM symbols of the transmission, wherein the set of OFDM symbols is according to the DCI;
    first UCI mapped to REs of the OFDM symbols, wherein mapping of the first UCI depends on a position of the DMRS, wherein said mapping includes the first UCI mapped to REs first in the frequency domain and then in the time domain; and
    the UL-SCH data mapped to REs of the one or more PRBs first in the frequency domain and then in the time domain after mapping the first UCI.

11. The cellular base station of claim 10, wherein the first UCI includes channel state information (CSI).

12. The cellular base station of claim 11, wherein the first UCI includes hybrid automatic repeat request acknowledgement (HARQ-ACK) information.

13. The cellular base station of claim 11, wherein the transmission includes second UCI, wherein the second UCI comprises hybrid automatic repeat request acknowledgement (HARQ-ACK) information, and wherein the HARQ ACK information is mapped to REs reserved for HARQ-ACK information after the mapping of the UL-SCH data.

14. The cellular base station of claim 13, wherein the HARQ-ACK information punctures the UL-SCH data mapped to the REs of the one or more PRBs.

15. The cellular base station of claim 13, wherein the HARQ-ACK information punctures the first CSI mapped to the REs of the OFDM symbols.

16. A non-transitory computer readable storage medium storing program instructions executable by one or more processors to cause a base station to:
  encode, for transmission to a user equipment (UE), downlink control information (DCI) scheduling a transmission including uplink shared channel (UL-SCH) data;
  receive, from the UE, the transmission including UL-SCH data;
  extract, from the transmission, uplink control information (UCI) multiplexed with the UL-SCH data from orthogonal frequency division multiplexing (OFDM) symbols in a time domain and in one or more physical resource blocks (PRBs) in a frequency domain, wherein the OFDM symbols and one or more PRBs include a plurality of time-frequency resource elements (REs);
  wherein the transmission includes:
    demodulation reference signals (DMRS) mapped to REs in a set of OFDM symbols of the transmission, wherein the set of OFDM symbols is according to the DCI;
    first UCI mapped to REs of the OFDM symbols, wherein mapping of the first UCI depends on a position of the DMRS, wherein said mapping includes the first UCI mapped to REs first in the frequency domain and then in the time domain; and
    the UL-SCH data mapped to REs of the one or more PRBs first in the frequency domain and then in the time domain after mapping the first UCI.

17. The non-transitory computer readable storage medium of claim 16, wherein the UL-SCH data is mapped to remaining REs that do not contain first UCI or DM-RS.

18. The non-transitory computer readable storage medium of claim 16, wherein the first UCI includes channel state information (CSI).

19. The non-transitory computer readable storage medium of claim 18, wherein the first UCI includes hybrid automatic repeat request acknowledgement (HARQ-ACK) information.

20. The non-transitory computer readable storage medium of claim 18, wherein the transmission includes second UCI, wherein the second UCI comprises hybrid automatic repeat request acknowledgement (HARQ-ACK) information, and wherein the HARQ ACK information is mapped to REs reserved for HARQ-ACK information after the mapping of the UL-SCH data.

* * * * *